Patented Feb. 19, 1952

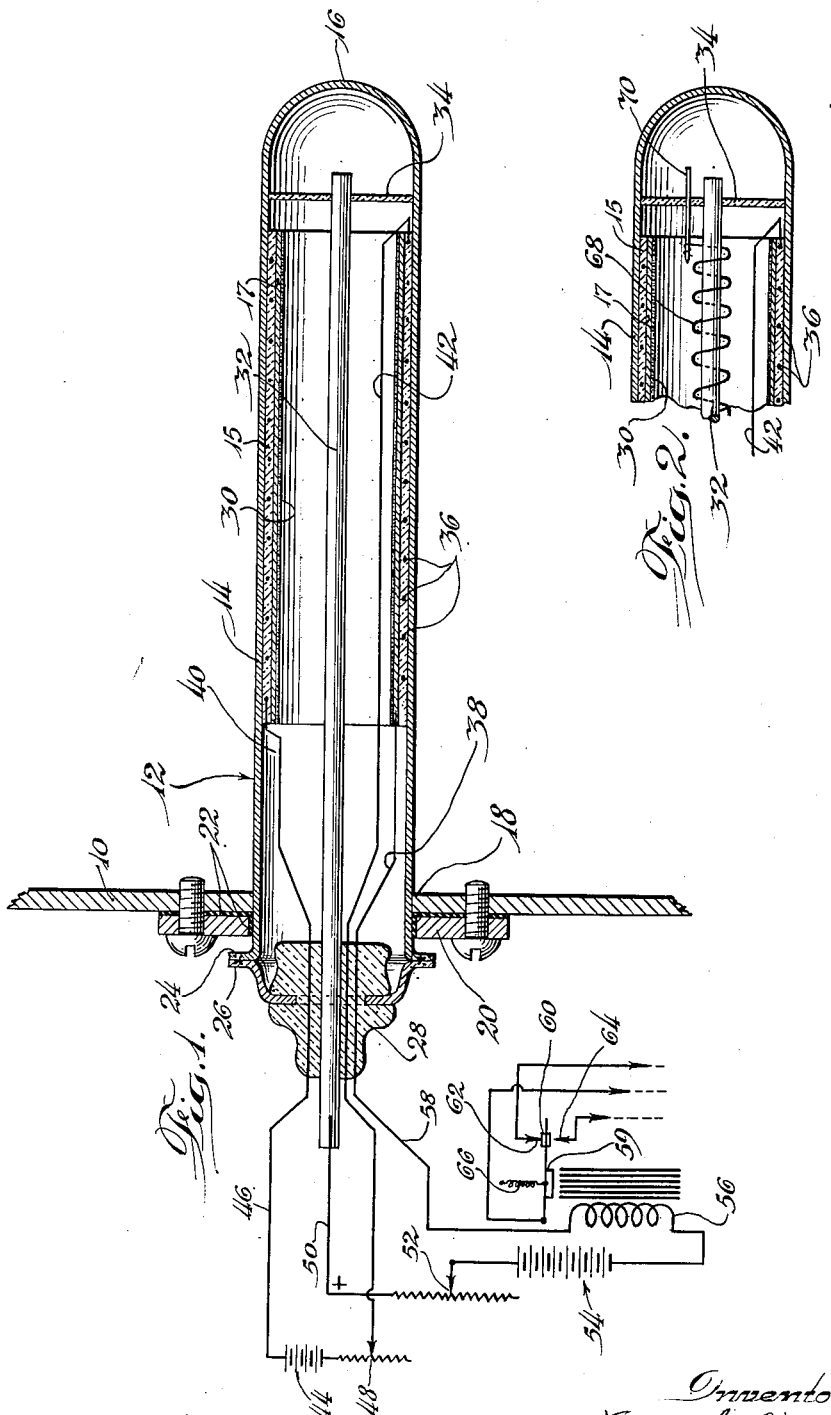

2,586,291

UNITED STATES PATENT OFFICE 2,586,291

ELECTRONIC TEMPERATURE CONTROL

Joseph L. Bender, Chicago, Ill., assignor to Stewart-Warner Corporation, Chicago, Ill., a corporation of Virginia Application December 11, 1948, Serial No. 64,796

2 Claims. (Cl. 313—310)

The present invention relates to the art of temperature controls and more particularly to an electronic device for sensing temperature, particularly high temperatures, and to circuits for use therewith.

It has been common in the art of heating systems to provide thermostatic devices for sensing high temperatures, such devices frequently being known as flame detectors, which are used in circuits to perform certain safety or regulating features. Thermostatic and similar devices are also used in various processes for detecting temperature changes and for operating controls. Under certain conditions (particularly under high temperature conditions) conventional thermostatic devices deteriorate rapidly and are hard to keep in adjustment. This is particularly the case if the atmosphere is somewhat corrosive as is true of the atmosphere within combustion chambers of heaters, furnaces and the like.

It is therefore one of the objects of my invention to provide a temperature sensing element which has no moving parts which need to be kept in adjustment and which further operates purely electronically so as not to require the making and breaking of contacts.

An additional object of my invention is to provide a device of the above character which is extremely rugged and is not easily damaged.

An additional object is to provide such a device at relatively low cost.

Yet another object is to provide a device of this character which will operate over a comparatively wide range of temperatures, particularly at high temperatures.

Other objects and advantages will become apparent from the following description of a preferred embodiment of my invention which is illustrated in the accompanying drawings.

In the drawings:

Fig. 1 is a diagrammatic longitudinal sectional view of a device embodying features of the present invention shown in conjunction with an electric control circuit operated thereby; and Fig. 2 is a fractional diagrammatic view similar to a portion of Fig. 1 showing an alternative arrangement which may be of advantage under certain circumstances.

In Fig. 1 of the drawings a plate indicated by the numeral 10 may be taken as representing the side wall of a combustion chamber or other device where under some conditions high temperatures prevail on one side of the wall. In Fig. 1 of the drawings it will be assumed that the high temperature region is located to the right of the wall 10. The control device of the present invention is indicated generally by the numeral 12 and comprises a tube 14, formed of nickel, stainless steel, fused quartz, or similar materials, which is closed at the remote end 16 so as to provide a container or envelope. This tubular element projects through an opening 18 in the wall 10 and is secured thereto by a flange 20. If the tubular element 14 is formed of metal the flange 20 may be secured directly thereto. However, if the tubular envelope is formed of materials such as fused quartz, preferably a gasket indicated by the numeral 22 is squeezed between the flange 20 and the wall 10 in such fashion as to be compressed against the tube 14 so as to form a friction fit therewith, thereby maintaining the tube 14 in proper operative position.

The outer end of the tube 14 if it is formed of metal is preferably rolled outwardly to form a flange 24 which is welded in face to face relationship with a similar flange 26 sealed to a glass press 28. This glass press is used, as is common, to bring out electric leads in airtight insulating relationship to the metal envelope.

The major portion of the interior of the envelope 14 is lined with an electron emitting coating 30 which is preferably of the oxide type and may be considered as essentially similar to the compositions used in forming the cathodes in ordinary radio tubes of the type wherein the cathode is heated by a separate filament or heater connected in a low voltage circuit. This coating preferably is deposited upon a thin nickel sleeve 17 which is inserted into the envelope with a layer of insulating material 15 separating the sleeve and the envelope. If the tube 14 is formed of an insulating material such as quartz, for instance, the metal sleeve 17 may be placed directly against the inner wall of the envelope. If desired, the sleeve 17 may be corrugated to increase its emitting area and to facilitate sizing and fitting to the envelope 14.

A rod like or closed tubular or similar anode 32 extends axially through the center of the envelope 14 in spaced relationship to the coating 30 and is supported at one end by the glass press 28 through which it passes and at the other end by an insulating collar or spider 34, the edges of which bear against the inner surface of the envelope. In order to extend the range of operation of the device I provide a cathode heater 36 shown as a coil of insulated wire buried within the insulation 15. If desired, this heating element may be arranged adjacent the coating but spaced a slight distance interiorly thereof or under some conditions, it may be preferred to wrap the heating element around the outside of the tube 14, the latter location simplifying construction of the tube but having the disadvantage that the heating element is then subjected to the erosive or corrosive atmosphere prevailing within the space the temperature of which is to be measured. Also, if desired, additional heat may be supplied to the device in the form of radiant energy from a radiant energy generator such as an infrared light bulb, for instance.

The envelope 14 with the electrodes indicated therein is then evacuated or if desired it may contain gas, such as mercury vapor at low pressure, the cathode supporting sleeve 17 being connected to an electric lead 38 which is brought out and sealed by the glass press 28. Similarly, the two ends of the heating element 36 are connected to leads 40 and 42 also brought out through the press 28.

In order to increase the rate of response of the device to changes in ambient temperature, the tube or envelope 14 may be provided with radiation flanges or fins if desired so as to increase the rate of heat transfer.

Although this device may be used in a number of different circuits it will be explained in connection with one of a comparatively simple nature which includes a battery 44 connected at one end by a line 46 to the heater lead 40. The other side of the battery is connected through a variable resistor 48 which in turn is connected to the other heater lead 42. With this arrangement adjustment of the slider of the variable resistor 48 determines the amount of electric energy being dissipated in the heating element 36. The anode 32 is connected by a lead 50 through a variable resistor 52 to the positive side of a B-battery 54, the negative side of which is connected through a relay coil 56 to a wire 58 which runs to the cathode lead 38. The relay coil 56 when energized to a certain degree attracts an armature 59 which is shown as shifting a swinging contact 60 away from one fixed contact 62 and against a second fixed contact 64. Normally the movable relay contact 60 is biased against contact 62 by a light spring 66. Since the device when in operation acts as a rectifier, an alternating current source may be substituted for the battery 54 if desired. Also, of course, an alternating current source may be used in place of the heater energizing battery 44.

The device operates in the following manner. If it is assumed that the variable resistor 48 is so adjusted that the slider is off the end of the resistance element and thus no current flows in the heating element 36 it will be apparent that the temperature of the cathode 30 will be the same as that of the surrounding atmosphere. If the temperature at the time is relatively low no current will flow between the cathode 30 and the anode 32 and thus the relay coil 56 will be de-energized. Under these conditions the contact 60 will engage the contact 62 so as to close any remote circuit connected between these contacts whereas any circuit including the contacts 60 and 64 will be open.

If now it is assumed that the temperature of the gaseous or liquid medium in which the tube 14 is submerged is gradually increased nothing of substantial consequence happens for a considerable range of increase. At some predetermined high temperature, however, the cathode coating 30 will be heated sufficiently so that it acts as an electron emitter of sufficient capacity to pass enough current between the cathode and anode 32 to energize the relay coil 56 sufficiently strongly to shift the swinging contact 60 from the fixed contact 62 to the fixed contact 64, thereby opening any circuit connected between the former contacts and closing any circuit including the contacts 60 and 64. As the temperature decreases the relay will open at some predetermined temperature when the electron emission drops below some predetermined level.

If it is desired to use the device described within a temperature range below that at which the electron emission from the cathode 30 normally would be sufficient to operate the relay 56, the heating element 36 is energized by adjustment of the variable resistor 48. By this means, the desired amount of energy may be supplied for heating the cathode such that the heat supplied by the heating element balances the heat loss to the surrounding space at some temperature below that at which it is desired to have the relay operate. As the surrounding temperature is increased so that the heat loss from the tube decreases, the temperature of the cathode will rise so that it acts as an electron emitter of sufficient strength even though the surrounding air or liquid temperature is considerably below that at which the cathode so operates without the additional heat. It will be appreciated, therefore, that by proper adjustment of the resistor 48 the temperature range of operation of the device may be extended downwardly considerably so as to give the device an extremely wide range of operation, the calibration or the picking of the control point being accomplished by the resistor 48.

Although the circuit shown illustrates direct operation of a sensitive relay by the electron tube it will be appreciated that the anode 32 may be connected into a conventional amplifying circuit so as to give considerable power in the output circuit which may be used as a measure of the strength of electron emission by the tube 14 and therefore may be used to determine the temperatures prevailing in the space within which the tube is submerged. If desired, a single tube can be used to operate in stepped sequence a plurality of relays, solenoids, bimetal switches and the like having a range of sensitivities so that they operate successively as the electron emission increases or decreases.

Under some conditions it may be desired to exercise additional control over the tube and this may be accomplished by providing a grid 68 shown in the embodiment illustrated in Fig. 2. This embodiment may be considered as essentially similar to that shown in Fig. 1 excepting that a grid is disposed between the cathode 30 and the anode 32, this grid being supported at one end by the press 28 through which it is energized and at the other end by a pin or similar support 70 which in turn is supported by the insulating disk 34. Such a grid by the use of any suitable circuit for changing the bias voltage thereon may be used for controlling the passage of current between the anode and the cathode.

In general, a nickel, stainless steel or similar envelope 14 may be used if the desired temperature range of operation of the device does not extend so high that these metals permit the passage therethrough of appreciable quantities of hydrogen which would tend to change the characteristics of the tube. At extremely high temperatures, therefore, it is preferable to form the tube 14 of fused quartz or some such substance which has the ability to withstand extremes in temperature without becoming pervious to hydrogen.

Although I have described a preferred embodiment of my invention and certain variations therefrom it will be appreciated that other variations and forms of the invention are contemplated and that the scope of the invention is to be measured by the following claims.

I claim:

1. A device to be used for sensing temperature in an electric circuit which is to be responsive to temperature changes in a high temperature medium which comprises an evacuated envelope to be submerged in the high temperature medium, means forming a cathode disposed against the inside surface of said envelope, said cathode having the characteristic of emitting electrons at a high temperature, an anode disposed within said envelope and spaced from said cathode, electric heating means within said envelope for heating said cathode to a temperature slightly below the temperature at which electrons are emitted by said cathode when the temperature of said medium is below that at which said circuit is to be responsive but sufficiently so that when the temperature of said medium rises to the point where the circuit is to be responsive the lower rate of heat loss from said heating means to said medium will enable said heating means to heat said cathode to a temperature above that at which electrons are emitted by said cathode.

2. A temperature sensing control device to be used in an electric circuit and responsive to temperature changes in a high temperature fluid medium which comprises an evacuated envelope to be submerged in the fluid medium, means forming a cathode disposed against the inside surface of said envelope, said cathode having the characteristic of emitting electrons at a high temperature, the surface against which said cathode is disposed being thermally highly conductive and electrically nonconductive, an anode disposed within said envelope and spaced from said cathode, and said envelope being formed of a material which is stable at temperatures well above the temperature at which said cathode emits electrons such that when the temperature of the fluid medium rises substantially to the electron emitting temperature of the cathode the device will become electrically conductive between the cathode and anode and such that fluid medium temperatures well above the last said temperature will not deleteriously affect said envelope.

JOSEPH L. BENDER.

REFERENCES CITED

The following references are of record in the file of this patent:

UNITED STATES PATENTS

| Number | Name | Date |
|---|---|---|
| Re. 20,210 | Knowles | Dec. 22, 1936 |
| 1,957,423 | Freeman | May 1, 1934 |
| 1,994,904 | Wilson | Mar. 19, 1935 |